United States Patent [19]

Harris et al.

[11] Patent Number: 5,079,308

[45] Date of Patent: Jan. 7, 1992

[54] BLENDS OF A POLY(AMIDE IMIDE) AND A POLY(ARYL ETHER KETONE)

[75] Inventors: James E. Harris, Piscataway; John P. Gavula, Lebanon, both of N.J.

[73] Assignee: Amoco Corporation, Chicago, Ill.

[21] Appl. No.: 516,082

[22] Filed: Apr. 27, 1990

Related U.S. Application Data

[63] Continuation of Ser. No. 187,576, Apr. 28, 1988, abandoned, which is a continuation of Ser. No. 837,321, Mar. 3, 1986, abandoned, which is a continuation of Ser. No. 626,105, Jun. 29, 1984, abandoned.

[51] Int. Cl.$^5$ .................... C08L 61/16; C08L 77/06
[52] U.S. Cl. ..................................... 525/434; 525/471
[58] Field of Search ................ 525/420, 471, 434

[56] References Cited

U.S. PATENT DOCUMENTS

| | | | |
|---|---|---|---|
| 3,324,199 | 6/1967 | Tocker | 525/420 |
| 4,340,697 | 7/1982 | Aya et al. | 525/420 |

FOREIGN PATENT DOCUMENTS 2108983  5/1983  United Kingdom ............... 525/471

Primary Examiner—John C. Bleutge
Assistant Examiner—Robert E. L. Sellers, II
Attorney, Agent, or Firm—William H. Magidson; Ralph C. Medhurst

[57] ABSTRACT

Described are blends of a poly(amide imide) and a poly(aryl ether ketone) and, optionally, a poly(arylene sulfide). Three blends exhibit improved solvent resistance and hydrolytic stability.

25 Claims, No Drawings

BLENDS OF A POLY(AMIDE IMIDE) AND A POLY(ARYL ETHER KETONE)

This is a continuation of application Ser. No. 187,576, filed Apr. 28, 1988, now abandoned, which is a continuation of Ser. No. 837,321, filed Mar. 3, 1986, now abandoned, which in turn is a continuation of Ser. No. 626,105, filed June 29, 1984, now abandoned.

BACKGROUND OF THE INVENTION

This invention is directed to blends of a poly(amide imide) and a poly(aryl ether ketone) and, optionally, a poly(arylene sulfide). These blends exhibit improved solvent resistance and hydrolytic stability.

Electrical connectors, in many applications, require high solvent resistance, dimensional stability, and ultimate use temperature. The material traditionally used in such applications is peroxide cured diallyl phthalate, which is a thermoset resin. Consequently, it cannot be processed by injection molding. Additionally, in some electrical connector applications, a poly(amide imide), hereinafter called "PAI", has been used.

Illustrative of these PAI's are polymers represented by repeating units of the formula:

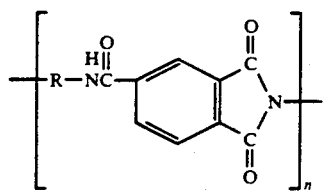

wherein R is selected from

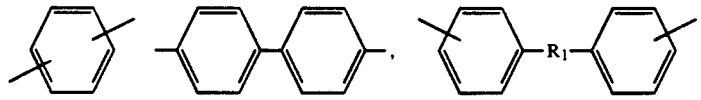

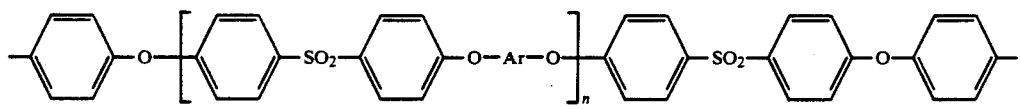

wherein $R_1$ is selected from O, —CO, S, alkylidene containing from 1 to about 10 carbon atoms, Ar is selected from

and n is an integer of from 0.05 to 25.

Also included are PAI copolymers having reocurring units of:

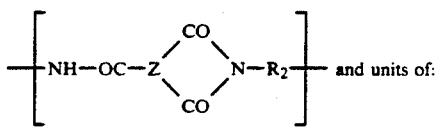 and units of:

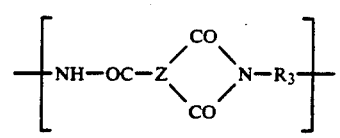

wherein one carbonyl is meta to and one carbonyl is para to each amide group wherein, Z is a trivalent aromatic moiety containing 1 to 4 benzene rings or lower-alkyl-substituted benzene rings, $R_2$ and $R_3$ are different and are divalent wholly- or largely-aromatic hydrocarbon radicals. These hydrocarbon radicals may be a divalent aromatic hydrocarbon radical of from 6 to about 10 carbon atoms, or two divalent aromatic hydrocarbon radicals of from 6 to about 10 carbon atoms joined directly or by stable linkages such as —O—, methylene, —CO—, —SO$_2$—, —S—; for example, —R'—O—R'—, —R'—CH$_2$—R'—, —R'—CO—R'—, —R'—SO$_2$—R'— and —R'—S—R'—, wherein R' is the said divalent aromatic hydrocarbon radical. By lower alkyl is meant an aliphatic radical of from 1 to about 6 carbon atoms.

Preferably the copolymers have reocurring units of the formula

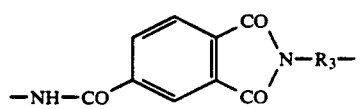

and

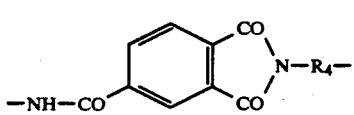

wherein $R_3$ and $R_4$ are different and are chosen from the class consisting of:

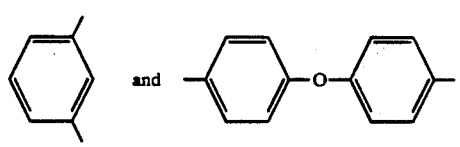

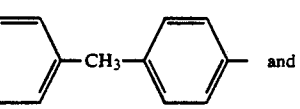 and

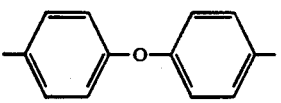

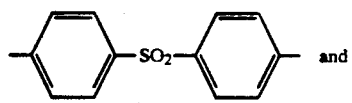

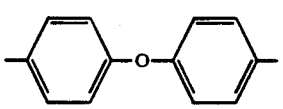

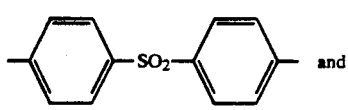

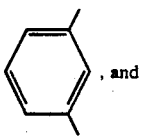

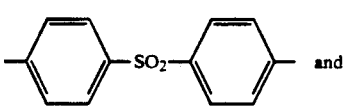

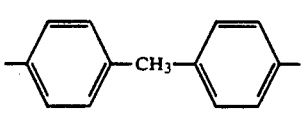

These PAIs are well known in the art and are prepared as described in, for example, U.S. Pat. Nos. 3,659,938, 3,988,374 and 4,016,140. Some of them are commercially available and sold under the trademark "Torlon" (Amoco Chemicals Corp. Chicago, Ill.).

Poly(amide imide)s have a high glass transition temperature (Tg) (>265° C.), excellent creep resistance and are able to meet the other requirements needed for high performance electrical connectors. However, PAIs are attacked by some solvents, such as pyridine at elevated temperatures and also they are hydrolyzed by bases. Further, articles molded from poly(amide imide) resins must undergo a prolonged curing process to develop high strength and impact resistance. For example, articles molded from a commercially available poly(amide imide), e.g., Torlon 4203L (obtained from Amoco Chemicals) are recommended to be cured in a circulating oven for 24 hours at 165° C., 24 hours at 245° C., and 24 hours at 260° C. Proceeding from one temperature to a higher temperature too quickly results in distorted and foamed parts.

As obviously desirable as such resins may be in some properties, it clearly would be desirable to be able to make molded products from them which possess increased solvent resistance and shorter cure times.

It has now been found that the combination of a poly(aryl ether ketone) hereinafter called "PAEK" and, optionally, a poly(arylene sulfide) hereinafter called "PAS", with a poly(amide imide) results in molded products having improved solvent resistance and much shorter cure times. A special bonus is improved hydrolytic stability over that possessed by PAI's. On the other hand, the combination yields molded products with improved strength, notched Izod toughness and heat deflection temperature over that provided by PAEK's alone and PAS alone. In this respect, the product retains the properties of the PAI.

DESCRIPTION OF THE INVENTION

This invention is directed to blends of poly(amide imide) described above and a poly(aryl ether ketone) and, optionally, a poly(arylene sulfide).

In the blend, the poly(amide imide) is used in amounts of from about 5 to about 95, preferably from about 20 to about 80 weight percent while the poly(aryl ether ketone) and, optionally, poly(arylene sulfide) are used in amounts of from about 95 to about 5, preferably from about 80 to about 20 weight percent.

The Poly(aryl ether ketone)

The crystalline poly(aryl ether ketone)s which are suitable for use herein can be generically characterized as containing repeating units of one or more of the following formulae:

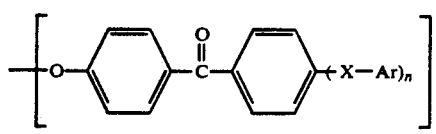
(I)

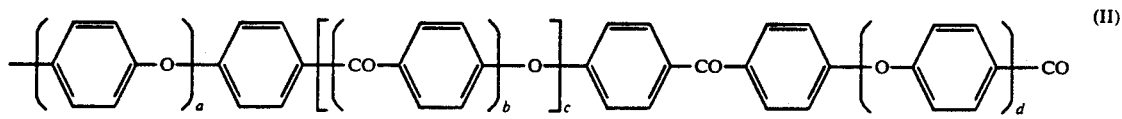
(II)

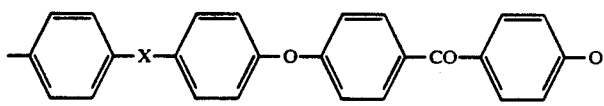
(III)

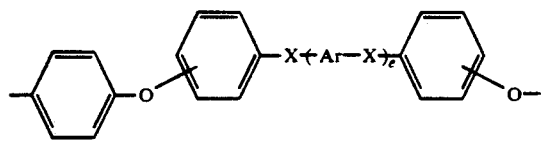  (IV)
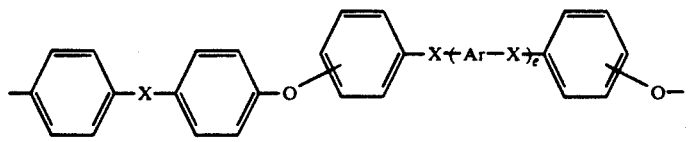  (V)
wherein Ar is independently a divalent aromatic radical selected from phenylene, biphenylene or naphthylene, X is independently O,
or a direct bond and n is an integer of from 0 to 3, b, c, d and e are 0 to 1 and a is an integer of 1 to 4 and preferably d is 0 when b is 1.
Preferred poly(aryl ketone)s include those having repeating units of the formula:
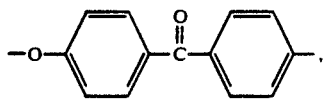
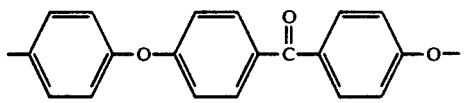
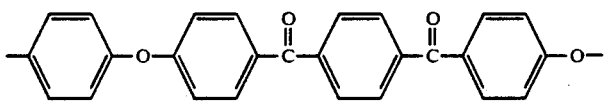
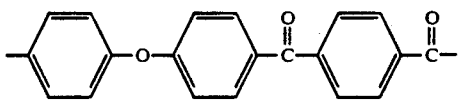
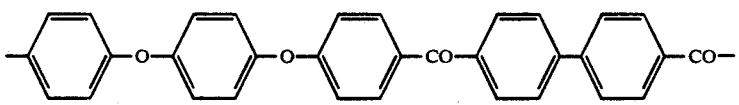
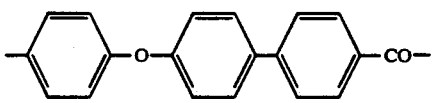
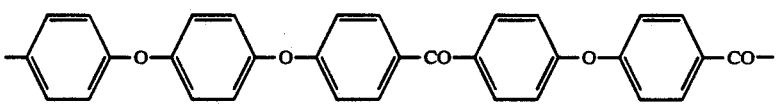
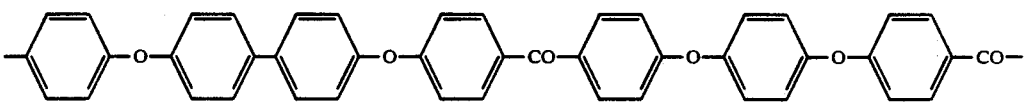
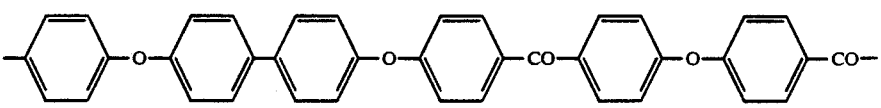

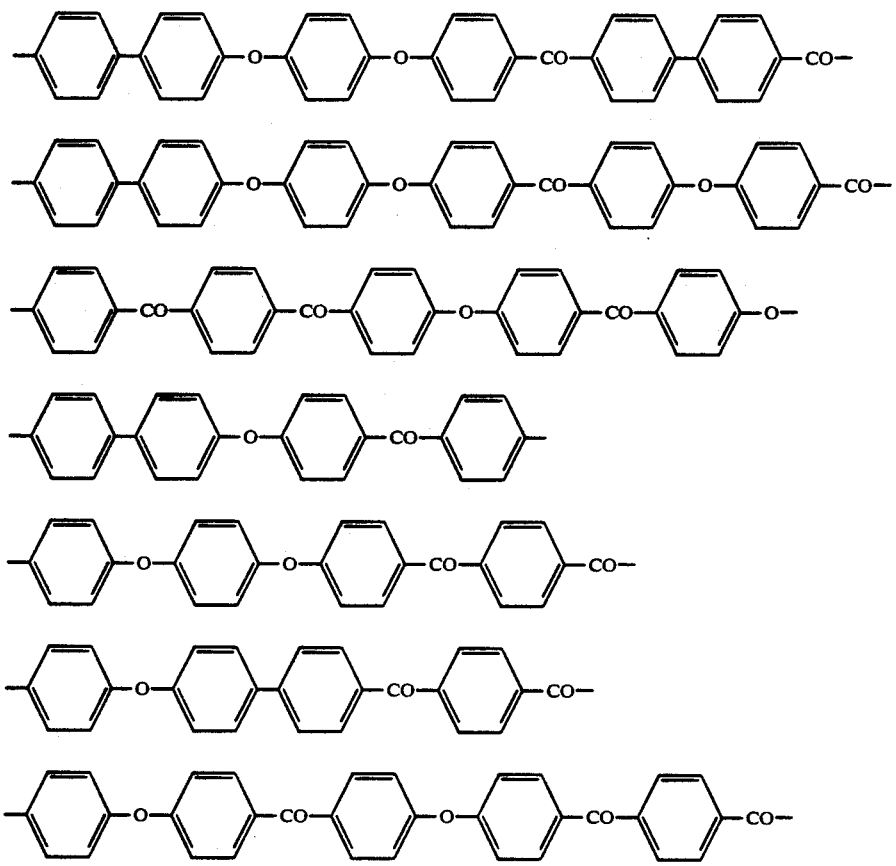

These poly(aryl ketone)s are prepared by methods well known in the art. One such method comprises heating a substantially equimolar mixture of at least one bisphenol and at least one dihalobenzoid compound or at least one halophenol compound. Preferred bisphenols in such a process include:
hydroquinone,
4,4'-dihydroxybenzophenone,
4,4'-dihydroxybiphenyl, and
4,4'-dihydroxydiphenyl ether.

Preferred dihalo and dihalobenzoid compounds include:
4-(4-chlorobenzoy)phenol,
4,4'-difluorobenzophenone,
4,4'-dichlorobenzophenone,
4-chloro-4'-fluorobenzophenone,

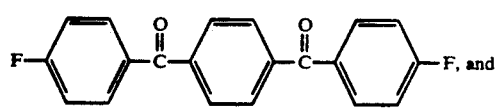

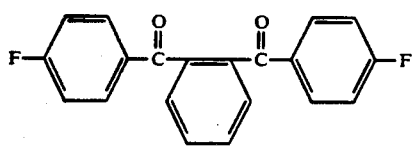

The poly(aryl ketone)s may be produced by the process as described in, for example, U.S. Pat. No. 4,176,222. This process comprises heating in the temperature range of 100° to 400° C., (i) a substantially equimolar mixture of (a) at least one bisphenol and (b) at least one dihalobenzenoid compound, or (ii) at least one halophenol, in which in the dihalobenzenoid compound or halophenol, the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.2 gram atoms of said alkali metal of higher atomic number per gram atom of sodium, the total amount of alkali metal carbonate or bicarbonate being such that there is at least one alkali metal atom for each phenol group present, and thereafter separating the polymer from the alkali metal halide.

Also, poly(aryl ketone)s such as those containing repeating units of the formula:

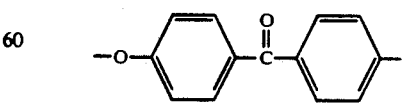

may be produced by Friedel-Craft reactions utilizing hydrogen fluoroide-boron trifluoride catalysts as described, for example in U.S. Pat. No. 3,953,400.

Additionally, poly(aryl ketones) of the following formula:

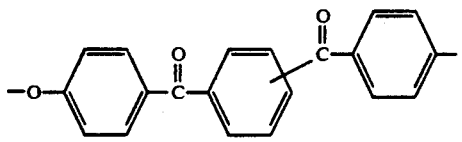

may be prepared by Friedel-Craft reactions using a boron fluoride-hydrogen fluoride catalyst as described in, for example, U.S. Pat. Nos. 3,441,538; 3,442,857 and 3,516,966.

The polyketones may also be prepared according to the process as described in, for example, U.S. Defensive Publication T 103,703 and U.S. Pat. No. 4,396,755. In such process, reactants such as (a) an aromatic monocarboxylic acid, (b) a mixture of at least one aromatic dicarboxylic acid, and (c) combinations of (a) and (b) are reacted in the presence of a fluoroalkane sulphonic acid, particularly trifluoromethane sulphonic acid.

Additionally, poly(aryl ketone)s of the following formulas:

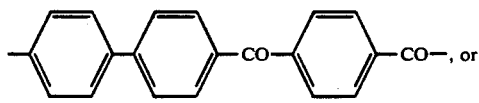

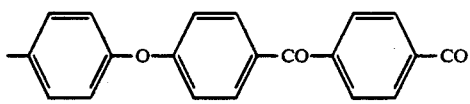

may also be prepared according to the process as described in, for example, U.S. Pat. No. 4,398,020. In such a process, (a) a mixture of substantially equimolar amounts of
(i) at least one aromatic diacyl halide of formula

YOC—Ar—COY where —Ar— is a divalent aromatic radical, Y is halogen and COY is an aromatically bound acyl halide group, which diacyl halide is polymerizable with at least one aromatic compound of (a)(ii), and (ii) at least one aromatic compound of the formula

H—Ar'—H wherein —Ar'— is a divalent aromatic radical and H is an aromatically bound hydrogen atom, which compound is polymerizable with at least one diacyl halide of (a)(i)

(b) at least one aromatic monoacyl halide of formula

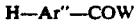
H—Ar"—COW where —Ar"— is a divalent aromatic radical and H is an aromatically bound hydrogen atom, Y is halogen, and COY is an aromatically bound acyl halide group, which monoacyl halide is self-polymerizable, and (c) a combination of (a) and (b) in the presence of a fluoroalkene sulphonic acid.

The term poly(aryl ketone) as used herein is meant to include homopolymers, copolymers, terpolymers, graft copolymers, and the like. For example, any one or more of the units (I) to (V) may be combined to form copolymers, etc.

The poly(aryl ether ketone)s have a reduced viscosity of at least about 0.4 to about 5.0 dl/g, as measured in concentrated sulphuric acid at 25° C.

Poly(arylene sulfide)

The poly(arylene sulfide)s which are suitable for use herein are solid, have a melting point of at least about 150° F. and are insoluble in common solvents. Such resins can be conveniently prepared by the process disclosed in, for example, U.S. Pat. No. 3,354,129. Briefly, the process comprises the reaction of an alkali metal sulfide and a polyhalo ring-substituted aromatic compound in the presence of a suitable polar organic compound, as for example, the reaction of sodium sulfide with dichlorobenzene in the presence of N-methyl-2-pyrrolidone to form poly(phenylenesulfide).

The resulting polymer contains the aromatic nucleus of the polyhalo-substituted monomer coupled in repeating units predominantly through a sulfur atom. The polymers which are preferred for use according to this invention are those polymers having the repeating unit —$R_{23}$—S— where $R_{23}$ is phenylene, biphenylene, naphthylene, or a lower alkyl-substituted derivative thereof. By lower alkyl is meant alkyl groups having one to six carbon atoms such as methyl, propyl, isobutyl, n-hexyl and the like.

The preferred poly(arylene sulfide) is poly(phenylene sulfide), a crystalline polymer with a repeating structural unit comprising a para-substituted benzene ring and a sulfur atom which may be described by the following formula, where p has a value of at least about 50.

Suitable poly(phenylene sulfide) compositions are available commercially under the trade name Ryton of the Phillips Petroleum Company. Preferably, the poly(phenylene sulfide) component has a melt flow index, measured at 600° F. using a 5 kg. weight and a standard orifice, within the range of from about 10 to about 7000 dg./min.

The term poly(arylene sulfide) is meant to include not only homopolymers but also arylene sulfide copolymers, terpolymers and the like.

Additives

It should, of course, be obvious to those skilled in the art that other additives may be included in the blends of this invention. These additives include plasticizers; pigments; flame retardants; reinforcing agents, such as glass fibers and carbon fibers; thermal stabilizers; ultraviolet light stabilizers; impact modifiers, and the like.

EXAMPLES

The following examples serve to give specific illustrations of the practice of this invention but they are not intended in any way to limit the scope of this invention.

The following designations are used in the examples and they have the following meaning:

PAEK

A polymer having repeat units of the formula:

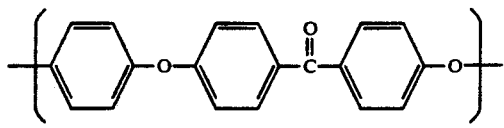

having a reduced viscosity of 1.2 as measured in 96% sulfuric acid (1 wt. % solution) at 25° C. (PEEK obtained from Imperial Chemicals Industries, Ltd.)

CONTROL A

Pellets of a poly(amide imide) [Torlon 4203L obtained from Amoco Chemicals Corp., Chicago, Ill.] where injection molded into ⅛ inch thick ASTM test bars at about 360° C. using a Newburg 1¼ ounce screw injection molding machine. The molded specimens were cured in a circulating air oven (Blue-M model POM7-206C obtained from Blue M Company, Blue Island, Ill. for 24 hours at 165° C., 24 hours at 245° C., and 24 hours at 260° C., successively. The test bars were tested for tensile yield strength, ultimate yield strength, yield elongation, ultimate elongation, and tensile modulus according to ASTM D-638; heat deflection temperature at 264 psi according to ASTM D-648; notched Izod impact strength according to ASTM D-256; and tensile impact strength according to D-1822.

The results are shown in Table I.

CONTROL B

Pellets of PAEK were injection molded into ⅛ inch ASTM test bars at about 360° C. using a Newburg 1¼ ounce screw injection molding machine. The molded samples were annealed at 200° C. for one hour in the circulating air oven described in Control A to fully develop crystallinity. The samples were then tested by the procedure as described in Control A.

The results shown in Table I.

EXAMPLE 1

A pellet blend of 40% by weight of the PAI of Control A and 60% by weight of the PAEK of Control B was injected molded into ⅛ inch ASTM test bars at about 345° C. in a Newburg screw injection molding machine. The molded samples were annealed/cured in the circulating air oven described in Control A at 260° C. for 24 hours. The samples were then tested by the procedure as described in Control A.

The results are shown in Table I.

EXAMPLE 2

Pellets of the PAI of Control A were molded into ASTM test bars by the procedure as described in Control A. These samples along with samples of the blend of Example 1 were placed in the circulating air oven described in Control A at 260° C. for 24 hours and then removed. The PAI bars were badly blistered and distorted while the bars of the PAI/PAEK blend appeared unaffected.

EXAMPLE 3

Pellets of the PAI of Control A were injection molded and cured as described in Control A, then weighed and placed in a cell constructed from a one inch diameter schedule 40 304 stainless steel pipe nipple capped at one end. The nipple was about 10 inches long. Pellets of the PAI/PAEK blend of Example 1 were also molded and cured as described in Example 1, then weighed and placed in the same capped nipple. The cell was filled to a level sufficient to cover the molded specimens with a 20% by weight sodium hydroxide solution. The other end of the nipple was capped and the entire cell was placed in a circulating air oven of the type described in Control A at 150°±2° C. for 24 hours. The cell was removed from the oven, cooled to room temperature and one cap was removed. The samples of the PAI had dissolved while the samples of the PAI/PAEK blend did not dissolve. Table II shows the weight gained by the bars immediately upon removal from the cell and their percentage loss in tensile properties due to exposure to the sodium hydroxide solution.

EXAMPLE 4

Pellets of the PAI of Control A were injection molded and cured as described in Control A, then weighed and placed in the cell described in Example 3. Pellets of the PAI/PAEK blend of Example 1 were also molded and annealed as described in Example 1, weighed and placed in the same capped nipple. The cell was then filled to a level sufficient to cover the molded specimens with pyridine. The other end of the nipple was capped and the entire cell was placed in the circulating air oven of the type described in Control A at 150°±2° C. for 24 hours. The cell was removed from the oven cooled to room temperature and one cap was removed. The samples were rinsed with water and towel dried. The samples of the PAI were partially dissolved, swollen, and adhered to each other. They consequently could not be individually weighed to determine weight change or tested. The samples of the PAI/PAEK blend could be weighed and tested, and their percent change in weight and tensile properties due to the exposure to pyridine are given in Table III.

EXAMPLE 5

A pellet blend of 60% by weight of the PAI of Control A and 40% by weight of the PAEK of Control B were injection molded into ⅛ inch ASTM test specimens at about 345° C. in a Newburg screw injection molding machine. These specimens along with molded specimens of Control A were placed in a circulating air oven of the type described in Control A at 255° C. for 24 hours and then removed. The PAI bars were distorted and blistered while the bars of the blend of the PAI/PAEK blend appeared unaffected.

TABLE I

| Example | Description of the Composition Ingredient | Wt. % | Temp. of Test (°C.) | Ultimate Tensile Strength (psi) | Ultimate Elongation (%) | Tensile Modulus (psi) | Tensile Impact (ft-lb/in²) | Notched Izod (ft-lb/in) of notch | Heat Deflection Temp. (°C., 264 psi ⅛") |
|---|---|---|---|---|---|---|---|---|---|
| Control A | PAI | 100 | 23 | — | — | — | 148 ± 73 | 3.6 ± .7 | >240 |
|  |  |  | 100 | 16,900 ± 700 | 12 ± 3 | 461,000 ± 32,000 |  |  |  |
|  |  |  | 150 | 12,800 ± 353 | 9 ± 4 | 454,000 ± 63,000 |  |  |  |
|  |  |  | 200 | 10,200 | 7 | 248,000 |  |  |  |

TABLE I-continued

| Example | Description of the Composition Ingredient | Wt. % | Temp. of Test (°C.) | Ultimate Tensile Strength (psi) | Ultimate Elongation (%) | Tensile Modulus (psi) | Tensile Impact (ft-lb/in²) | Notched Izod (ft-lb/in) of notch | Heat Deflection Temp. (°C., 264 psi, 1") |
|---|---|---|---|---|---|---|---|---|---|
| Control B | PAEK | 100 | 23 | 12,200 ± 144 | 34 ± 2 | 537,000 ± 12,000 | 102 ± 49 | 1.15 ± 0.09 | 160 |
| | | | 100 | 9,750 ± 63 | 42 ± 4 | 527,000 ± 53,000 | | | |
| | | | 150 | 6,350 ± 49 | 130 | 181,000 ± 8,500 | | | |
| | | | 200 | 5,200 ± 141 | 143 ± 66 | 88,000 ± 56,000 | | | |
| | PAI | 40 | 23 | 14,300 ± 495 | 4.2 ± 0.6 | 578,000 ± 9,900 | 78 ± 32 | 2.92 ± 0.72 | >246 |
| | PAEK | 60 | 100 | 12,800 | 14 ± 5 | 499,000 ± 57,000 | | | |
| | | | 150 | 9,270 ± 834 | 40 ± 4 | 242,000 ± 2,800 | | | |
| | | | 200 | 3,700 ± 1,550 | 19 ± 9 | 91,600 ± 37,000 | | | |

TABLE II

Change in Weight and Tensile Properties of Poly(amide imide) and a blend of Poly(aryl ether ketone)/Poly(amide imide) after 24 Hours in 20% Sodium hydroxide at 150° C.

| Example | Description of the Composition | % Weight Change | % Change in Tensile Strength | % Change in Modulus | % Change in Elongation at Break |
|---|---|---|---|---|---|
| Control A | PAI 100% | Dissolved | — | — | — |
| I | PAI 40% PAEK 60% | +5 | −54 | +6.6 | −74 |

TABLE III

Change in Weight and Tensile Properties of Poly(amide imide) and a blend of Poly(aryl ether ketone)/Poly(amide imide) after 24 Hours in Pyridine at 150° C.

| Example | Description of the Composition | % Weight Change | % Change in Tensile Strength | % Change in Modulus | % Change in Elongation at Break |
|---|---|---|---|---|---|
| Control A | PAI 100% | Distorted | — | — | — |
| I | PAI 40% PAEK 60% | +25 | −54 | −17 | −55 |

What is claimed is:

1. A blend comprising from about 5 to about 95 weight percent of a poly(amide imide) and from about 5 to about 95 weight percent of a crystalline poly(aryl ether ketone) comprising repeating units selected from at least one of the following formulae:

(A)
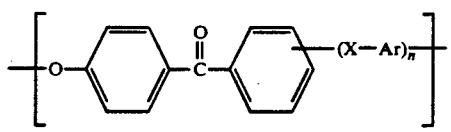

or (B)
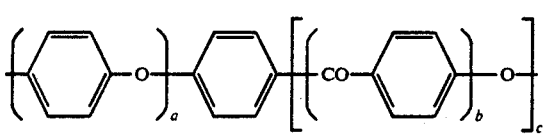

wherein Ar is independently a divalent aromatic radical selected from phenylene, biphenylene or naphthylene; n is an integer of from 0 to 3; a is an integer of from 1 to 4; b, c, d and e are 0 to 1; X is independently O, C=O, or a direct bond.

2. The blend of claim 1 wherein said poly(aryl ether ketone) comprises units of the structure:

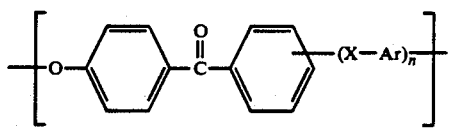

3. The blend of claim 2 wherein X comprises O.

4. The blend of claim 2 wherein X comprises

5. The blend of claim 1 wherein said poly(aryl ether ketone) comprises units of the structure:

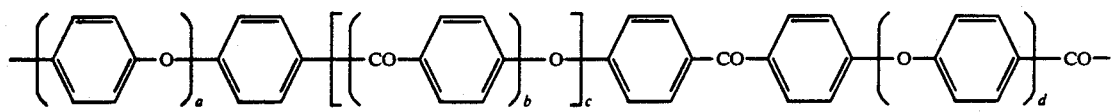
6. The blend of claim 1 wherein said poly(aryl ether ketone) comprises units of the structure:
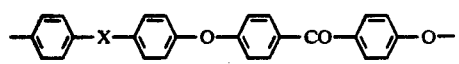
7. The blend of claim 1 wherein said poly(aryl ether ketone) comprises at least one repeating unit selected from the group consisting of:
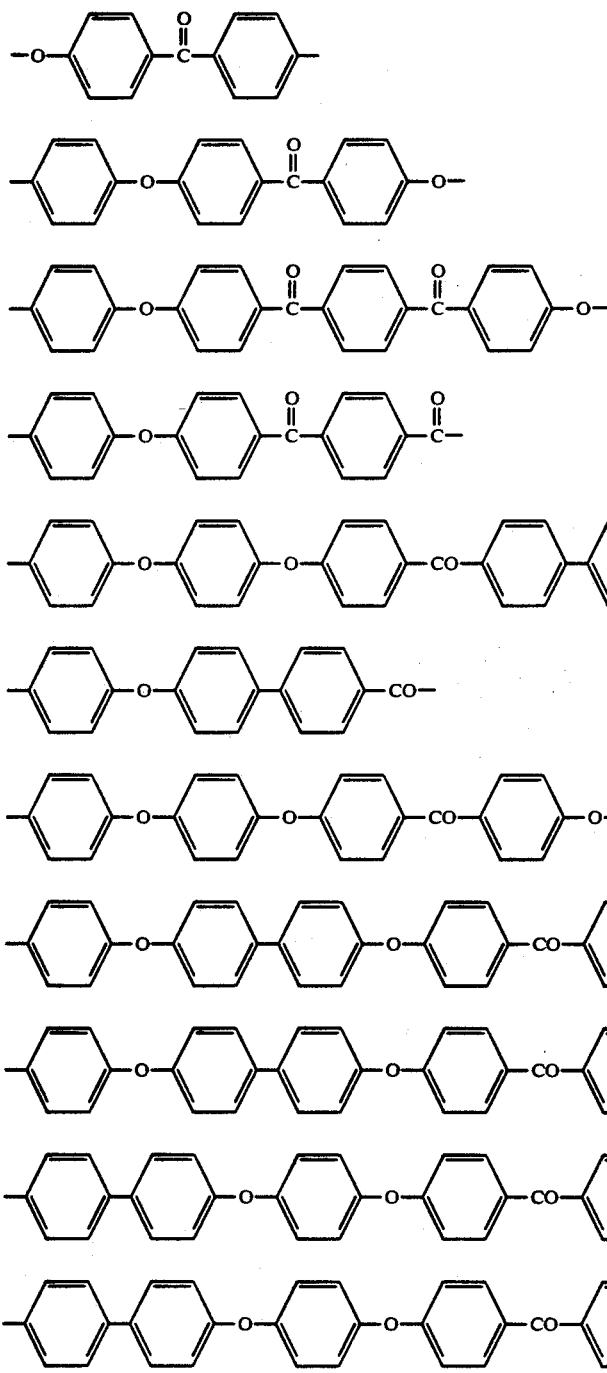

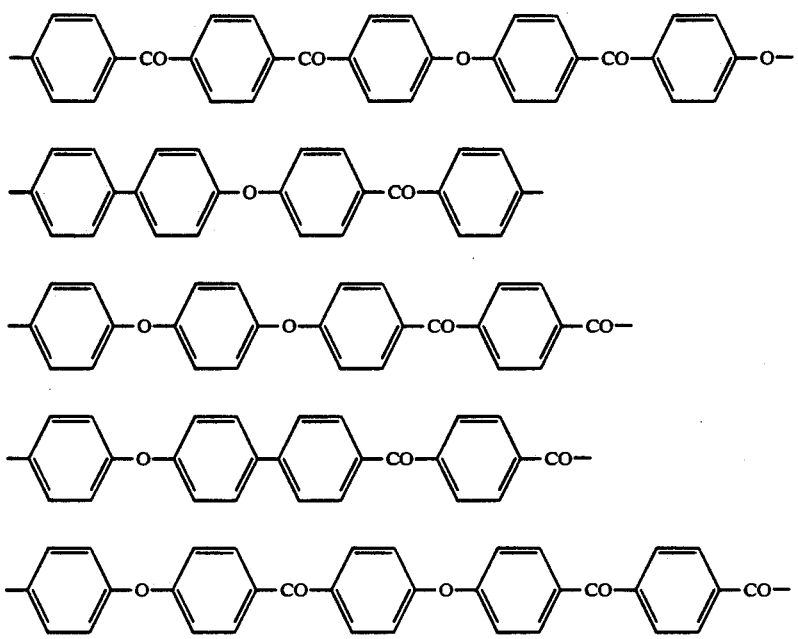

8. A blend as defined in claim 1 wherein the poly(amide imide) is of the following formula:

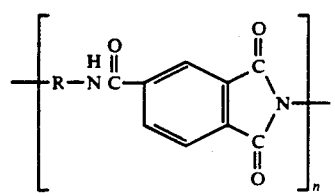

wherein R is selected from

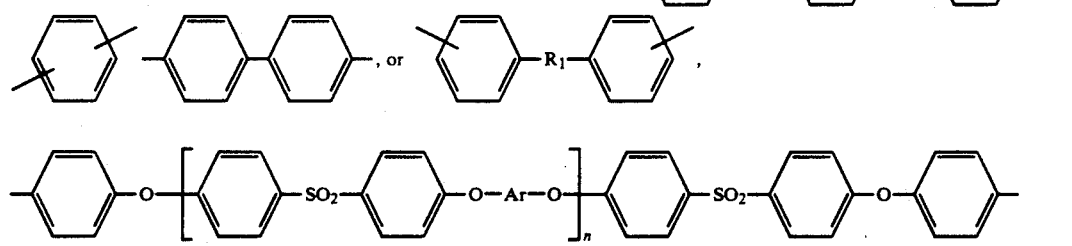

wherein $R_1$ is selected from O, —CO, S, or alkylidene containing from 1 from about 10 carbon atoms, Ar is selected from

and n is an integer of from 0.05 to 25.

9. A blend as defined in claim 8 wherein the poly(aryl ether ketone) comprises a repeating unit of the formula:

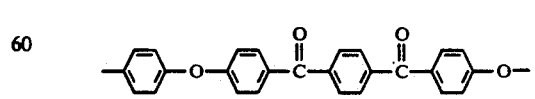

10. A blend as defined in claim 8 wherein the poly(aryl ether ketone) comprises a repeating unit of the formula:

11. A blend as defined in claim 8 wherein the poly(aryl ether ketone) comprises a repeating unit of the formula:

12. A blend as defined in claim 8 wherein the poly(aryl ether ketone) comprises a repeating unit of the formula:

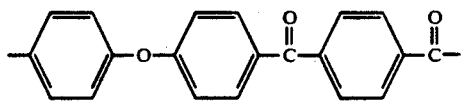

13. A blend comprising from about 5 to about 95 weight percent of a poly(amide imide) and from about 5 to about 95 weight percent of a crystalline poly(aryl ether ketone) consisting essentially of repeating units selected from at least one of the following formulae:

(A)

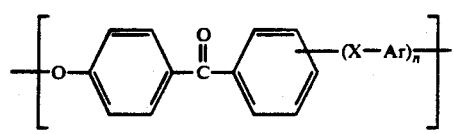

or (B)

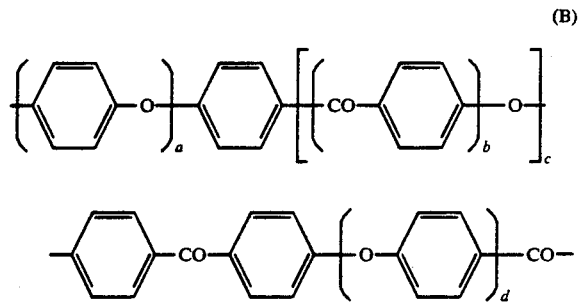

wherein Ar comprises at least one divalent aromatic radical selected from the group consisting of phenylene, biphenylene and naphthylene; n is an integer of from 0 to 3; a is an integer of from 1 to 4; b, c, d and e are 0 to 1; and X comprises at least one member selected from the group consisting of O, C=O and a direct bond.

14. A blend of claim 13 wherein said poly(aryl ether ketone) consist essentially of units of the structure:

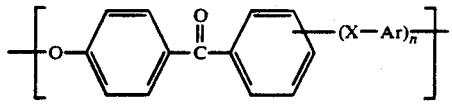

15. The blend of claim 14 wherein n is at least 1.
16. The blend of claim 15 wherein X comprises O.
17. The blend of claim 15 wherein X comprises

18. The blend as defined in claim 14 wherein the poly(aryl ether ketone) comprises a repeating unit of the formula:

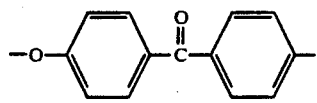

19. The blend as defined in claim 14 wherein the poly(aryl ether ketone) comprises a repeating unit of the formula:

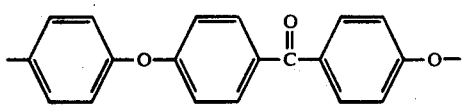

20. The blend as defined in claim 14 wherein the poly(aryl ether ketone) comprises a repeating unit of the formula:

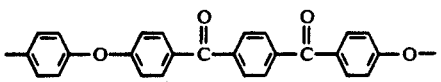

21. The blend as defined in claim 14 wherein the poly(aryl ether ketone) comprises a repeating unit of the formula:

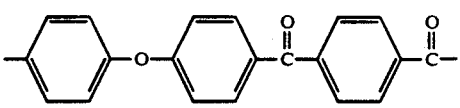

22. The blend of claim 14 wherein said poly(aryl ether ketone) consist essentially of units of the structure:

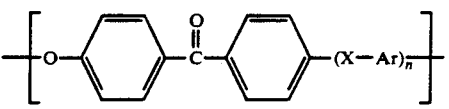

and n is at least 1.

23. A molded article comprising a cured composition formed from a blend comprising from about 5 to about 95 weight percent of a poly(amide imide) and from about 5 to about 95 weight percent of a crystalline poly(aryl ether ketone) consisting essentially of repeating units selected from at least one of the following formulae:

(A)

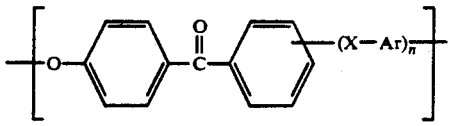

(B)

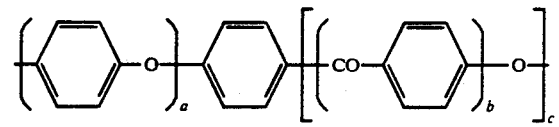

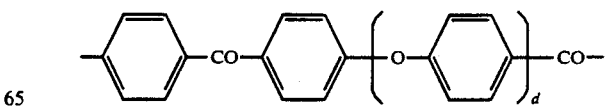

wherein Ar comprises at least one divalent aromatic radical selected from the group consisting of phenylene, biphenylene and naphthylene; n is an integer of from 0 to 3; a is an integer of from 1 to 4; b, c, d and e are 0 to 1; and X comprises at least one member selected from the group consisting of O, C=O and a direct bond.

24. The blend of claim 23 wherein said poly(aryl ether ketone) comprises repeating units of the structure:

$$\left[ -O - \underset{}{\underset{}{\bigcirc}} - \underset{O}{\overset{\overset{O}{\parallel}}{C}} - \underset{}{\underset{}{\bigcirc}} - (X-Ar)_n \right]$$

25. The blend of claim 24 wherein X comprises O.

* * * * *